United States Patent
Byelov et al.

(10) Patent No.: US 10,587,524 B2
(45) Date of Patent: Mar. 10, 2020

(54) MULTI-TAGGED MULTI-TENANT RATE LIMITING

(71) Applicant: Ayla Networks, Inc., Santa Clara, CA (US)

(72) Inventors: Vadym Byelov, Mountain View, CA (US); Sudha Sundaresan, San Jose, CA (US)

(73) Assignee: Ayla Networks, Inc., Milpitas, CA (US)

( * ) Notice: Subject to any disclaimer, the term of this patent is extended or adjusted under 35 U.S.C. 154(b) by 211 days.

(21) Appl. No.: 15/475,086

(22) Filed: Mar. 30, 2017

(65) Prior Publication Data

US 2017/0289053 A1    Oct. 5, 2017

Related U.S. Application Data

(60) Provisional application No. 62/316,330, filed on Mar. 31, 2016.

(51) Int. Cl.
*H04L 12/825* (2013.01)

(52) U.S. Cl.
CPC .................... *H04L 47/25* (2013.01)

(58) Field of Classification Search
None
See application file for complete search history.

(56) References Cited

U.S. PATENT DOCUMENTS

| | | |
|---|---|---|
| 2011/0173342 A1 | 7/2011 | Cooper et al. |
| 2011/0258692 A1 | 10/2011 | Morrison et al. |
| 2014/0380145 A1 | 12/2014 | Wilsher et al. |
| 2015/0230152 A1 | 8/2015 | Raleigh et al. |

OTHER PUBLICATIONS

PCT International Search Report for PCT/US2017/025439 dated Jul. 6, 2017.
PCT Written Opinion of The International Searching Authority for PCT/US2017/025439 dated Jul. 6, 2017.
Fortinet. "Web Application Firewall Fort/Web Administration Guide," Version 5.5, pp. 1-859, Dec. 15, 2015, [retrieved on May 30, 2017]. Retrieved from the Internet: <URL: http://docs.fortinet.com/uploaded/files/2791/FortiWeb_5_5_Administration_Guide_Revision1.pdf> entire document.
Cisco. "Cisco ACNS Software, Command Reference," Release 5.5 Text Part No. OL-9361-01, 2006 pp. 1-981, (retrieved on May 30, 2017]. Retrieved from the Internet: <URL: http://www.cisco.com/c/en/us/td/docs/app_ntwk_services/waas/acns/v55/command/reference/55cref.pdf> entire document.

*Primary Examiner* — Scott B Christensen
(74) *Attorney, Agent, or Firm* — Lowenstein Sandler LLP

(57) ABSTRACT

A rate limiting module receives a first request at a first time that comprises a first tag associated with a first attribute and a second tag associated with a second attribute. A second request is received at a second time that occurs after the first time that includes the first tag and the second tag. Responsive to determining that the second request violates a first rate limit for the first attribute, the rate limiting module rejects the second request. A third request is received at a third time that occurs after the second time that includes the first tag and the second tag. The rate limiting module determines that the third request violates a second rate limit for the second attribute, determines that the second rate limit is to be bypassed, and forwards the third request.

20 Claims, 12 Drawing Sheets

MULTI-TAGGED MULTI-TENANT RATE LIMITING

RELATED APPLICATIONS

The present application claims the benefit of U.S. Provisional Application No. 62/316,330 filed Mar. 31, 2016, which is incorporated herein by reference.

BACKGROUND

Many modern appliances, consumer devices, and other devices include embedded systems that are configured to perform one or more dedicated functions. Embedded systems of such devices that provide networking capabilities may periodically send requests to hosted applications that provide various support capabilities for the embedded systems.

Devices with embedded systems may be configured to operate in "multi-tenant" environments where a single instance of an application executes on a server device and serves multiple "tenants". A tenant, or client, is a group of users that share common access with instance of the application. For example, a tenant may be an original equipment manufacturer (OEM) of the devices with the embedded systems. Typically, multi-tenant environments perform "rate limiting" of requests received from tenant devices in order to control the rate of network traffic received from different tenant devices in the network. Rate limiting provides the benefit of managing network resources effectively across clients, as well as protecting the network from being overtaxed by excessive traffic.

BRIEF DESCRIPTION OF THE DRAWINGS

Reference will now be made to the accompanying drawings showing example embodiments of the present application.

DETAILED DESCRIPTION OF EMBODIMENTS

Figure 1:
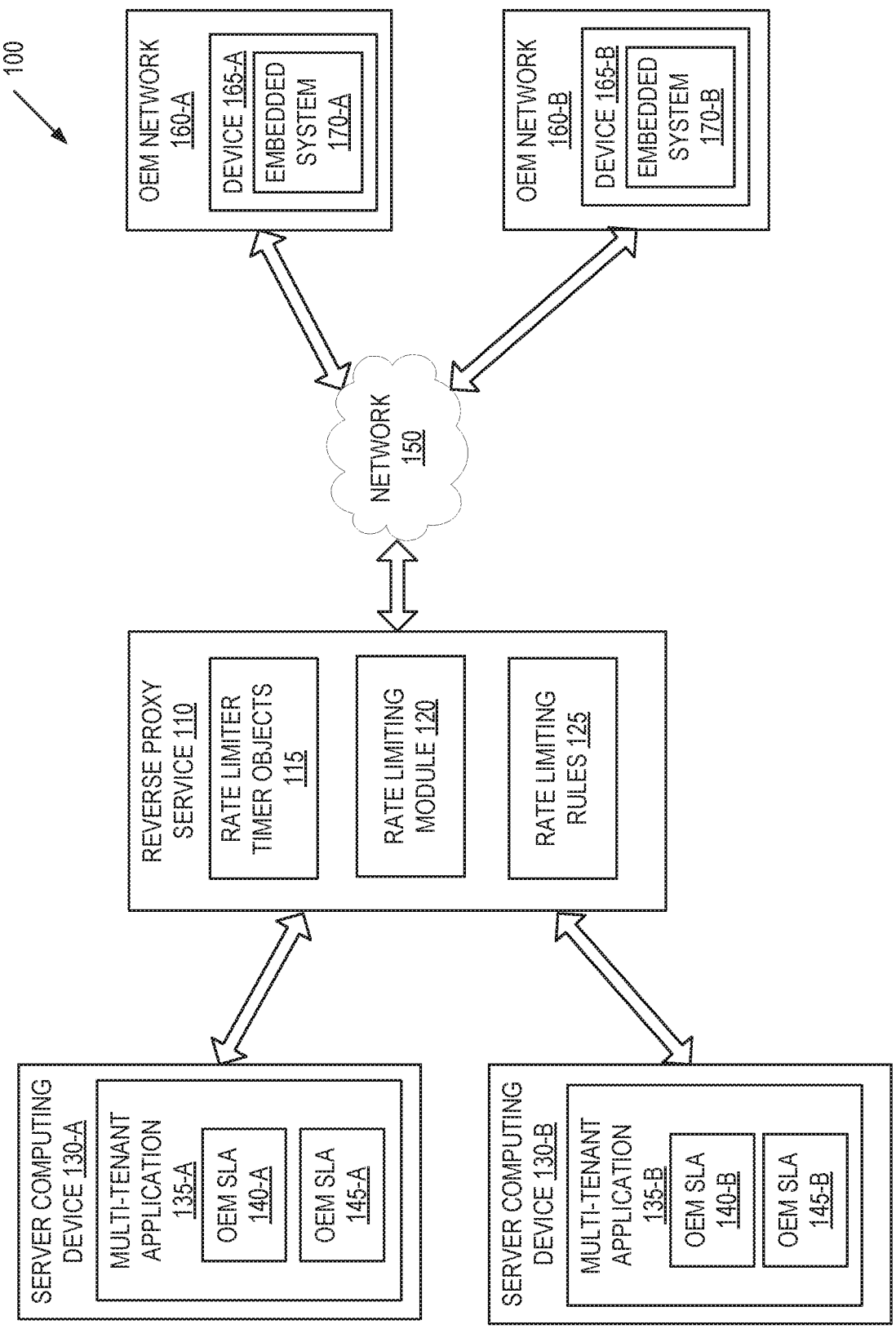
FIG. 1 is a block diagram depicting an example network architecture including a reverse proxy for multi-tagged multi-tenant rate limiting, in accordance with an embodiment of the present disclosure.

Embodiments are directed to a rate limiting component of a reverse proxy or other system that can perform multi-tagged multi-tenant rate limiting of requests received from devices with embedded systems in a multi-tenant application environment. The rate limiting component is capable of defining rate limiting parameters for network traffic using data fields (or, "tags") embedded in each received request. These tags can be specific to the device (local tags), such as an IP address, or defined by the OEM for the device (non-local tags), such as a unique identifier for the OEM. Each tag may be used to invoke a rate limiting rule by the reverse proxy to control the rate of network traffic. The rate limiting component may time limit received requests based on rules associated with the tags in the request. Timers may be initiated upon receiving a request for each tag that can block any future requests from being forwarded to an application until that timer expires. This can prevent excessive requests from "rogue" devices from overwhelming the network. For example, errant software updates could cause a device to enter an error state where it sends repeated requests to the multi-tenant application. Additionally, a distributed denial-of-service attack (DDoS) by a third party could flood the system with requests with the intent to disable the network.

Using multiple tags concurrently to rate limit request can sometimes lead to rejecting requests above the limits of a service level agreement for a tenant. For example, a request that is received may start a timer for a first tag that uses a more restrictive rate limiting rule (limiting requests to one per second) and a second timer for a second tag that uses a less restrictive rate limiting rule (limiting requests to three per second). If a subsequent request is received such that the first rule is violated, but the second rule is not, the subsequent request could start an additional timer for the less restrictive rule that could cause a third request to be rejected based on the less restrictive rule even if it would be allowed by the more restrictive rule.

The rate limiting component of the reverse proxy described in embodiments herein can remedy this by implementing a bypass timer associated with a rate limiting timer that can allow some requests to be forwarded. The rate limiting component may receive a first request that includes a first tag and a second tag, and start timers associated with each of the tags based on rate limits associated with each tag, where one rate limit is more restrictive than the other. Upon receiving a subsequent request that includes the same tags, the rate limiting component may check the status of the timers to determine if the subsequent request should be forwarded or rejected. If the subsequent request violates the more restrictive rate limit, but not the less restrictive rate limit, a new timer may be started that is associated with the less restrictive rate limit. The rate limiting component may also start a bypass timer associated with the less restrictive rate limit that expires at the same time as the less restrictive rate limit. The rate limiting component may determine that a third request that is received after the timer for the more restrictive rate limit expires, but while the timer for the less restrictive rate limit is still active may not be rejected. The rate limiting component may determine that the timer for the less restrictive rate limit may be bypassed due to the existence of the bypass timer, and may subsequently forward the request to a multi-tenant application.

Referring now to the figures, FIG. 1 is a block diagram depicting an example network architecture 100 including a reverse proxy for multi-tagged multi-tenant rate limiting. The network architecture 100 can include one or more original equipment manufacturer (OEM) networks 160, each of which may include one or more devices 165. Each OEM network 160 may be connected to a reverse proxy service 110 via network 150. The reverse proxy service 110 can rate limit requests for a multi-tenant application environment that is made up of one or more service computing devices 130, each of which may include one or more multi-tenant applications 135.

The devices 165 may be devices with embedded systems 170, and may include, for example, electrical appliances such as refrigerators, ovens, washers, driers, dishwashers, thermostats, alarms, air conditioners, televisions, radios, receivers, amplifiers, and so forth. The devices 165 may also include consumer devices such as digital watches, music players, game consoles, digital cameras, printers, and so forth. Other examples of devices 165 include stationary devices such as HVAC systems, traffic lights, factory controllers, signs, electronic billboards, sprinkler systems, and irrigation control systems, as well as medical devices. Devices 165 may also be any other type of device that includes an embedded system 170.

An embedded system 170 is a class of computing device that is embedded into another device 165 as one component of the device 165. The device 165 typically also includes other hardware, electrical and/or mechanical components that may interface with the embedded system. Embedded system 170 is typically configured to handle a particular task or set of tasks, for which the embedded system 170 may be optimized. Accordingly, the embedded system 170 may have a minimal cost and size as compared to general computing devices.

OEM networks 160 may represent groups of devices that are for a particular client of the multi-tenant application service attached to reverse proxy 110. OEM network 160-A and 160-B may represent separate tenants of the multi-tenant application service. Meaning, each of OEM networks 160-A and 160-B may include separate and distinct business entities and/or groups of physical devices 165. The devices 165-A from OEM network 160-A may have been manufactured by a particular OEM, but may be owned by different end users. Accordingly, such devices 165-A may share the same OEM tag, but may be associated with different user tags, different IP address tags, and so on. Similarly, devices 165-B from OEM network 160-B may be manufactured by a single OEM, but may be owned by different end users.

Network 150 may include a router, switch, bridge or other network device (not shown) that enables communication between multiple devices (e.g., device 145, computing device 110, etc.) connected to the LAN 165. The network device may provide wired connections to the LAN using, for example, Ethernet ports, universal serial bus (USB) ports and/or Firewire® ports. The network device may additionally provide wireless connections to the LAN using, for example, a Wi-Fi® transceiver. Network 150 may be a private WAN (e.g., an intranet) or a public WAN such as the Internet, or may include a combination of a private and public network. Network 150 may include a router and/or modem (e.g., a cable modem, a direct serial link (DSL) modem, a Worldwide Interoperability for Microwave Access (WiMAX®) modem, an long term evolution (LTE®) modem, etc.) that provides a connection to the network 150.

The server computing devices 130 may include a physical machine and/or a virtual machine hosted by a physical machine. The physical machine may be a rackmount server, a desktop computer, or other computing device. In one embodiment, the server computing devices 130 can include a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

The server computing devices 130 host multi-tenant applications 135 which may be web based applications and/or cloud services (e.g., a web based service hosted in a cloud computing platform). Each of the multi-tenant applications may provide particular application services to the connected devices 165, receive requests from the devices 165, and/or embedded systems 170 and return responses. For example, a multi-tenant application may provide weather related information to a thermostat in a home or office. The thermostat may send information monitored within the home (e.g., monitored temperature, heating/cooling settings, etc.) to the weather application to be analyzed in light of weather conditions in the area.

Each multi-tenant application 135 may have a unique uniform resource identifier (URI) with a different metering policy that controls its rate limiting thresholds. The multi-tenant applications 135 may also include one or more OEM service level agreements (SLAs) for the OEM networks 160 whose devices 165 send requests to the multi-tenant applications 135. For example, an SLA 140-A may specify that requests from a particular IP address of OEM network 160-A may only be forwarded to multi-tenant application 135-A at a rate of one request per second. Additionally SLA 145-A may specify that requests from any device 165 within OEM network 160-A may only be forwarded to multi-tenant application 135-A at a rate of three requests per second.

The network 150 may include or connect to a reverse proxy service 110 that can rate limit requests received from the devices 165 of OEM networks 160 prior to forwarding them to one or more of the multi-tenant applications 135 that reside on service computing devices 130. Reverse proxy service 110 may include a rate limiting module 120, rate limiting rules 125, and rate limiter timer objects 115 (also referred to as timers and rate limiter objects). Reverse proxy service 110 may include a physical machine and/or a virtual machine hosted by a physical machine. The physical machine may be a rackmount server, a desktop computer, or other computing device. In one embodiment, the reverse proxy service 110 can include a virtual machine managed and provided by a cloud provider system.

Rate limiting module 120 can receive requests from devices 165 (or the embedded systems 170 on those devices) and determine whether to forward the requests to a destination multi-tenant application 135, or to reject the requests based on the OEM SLAs 140-145 associated with the OEM network 160 associated with the device.

Requests received from the devices 165 may be tagged with information that can include a networking header, information describing the embedded system, the device, the OEM network, the uniform resource identifier (URI) information for the destination multi-tenant application 135, data to be sent to the destination multi-tenant application 135 for processing, or the like. Requests may be implemented using any protocol that supports communication with embedded systems, such as Message Queue Telemetry Transport (MQTT), Constrained Application Protocol (CoAP), Hypertext Transfer Protocol (HTTP), or the like. Each request may additionally include data tags (or, "tags") that may be used to limit the rate at which the received requests may be forwarded to one of the multi-tenant applications 135. The tags may be used by rate limiting module 120 to rate limit any requests that are received by the reverse proxy service 110 from multiple OEM networks 160 and individual devices 165 within those OEM networks. In embodiments, a tag attribute may include an internet protocol (IP) address, an original equipment manufacturer (OEM) identifier, an authentication token, a user identifier, a unique identifier associated with an individual device 165, a hardware version of the individual device 165, a version of a software component (e.g., firmware version) installed on the individual device 165, an identifier for a component of the individual device 165 (e.g., a component name), a setting type for a hardware or software component of the individual device 165 (e.g., a setting that indicates temperature in Fahrenheit for a weather measurement component), a combination of attributes, or other similar information.

Upon receiving a request, rate limiting module 120 may access rate limiting rules 125 to determine the rate limits associated with one of the SLAs 140-145 for the applicable OEM network 160. The rate limiting rules 125 may store rate limits for a particular OEM network 160 along with the associated tags that will invoke their use upon receiving a request. One rate limiting rule may specify that requests received from the same IP address (e.g., requests that have an "IP tag" with a particular attribute value) may be limited to one request per second. Similarly, a second rate limiting rule may specify that requests received from the same OEM network 160 (e.g., requests that have an "OEM tag" with a particular attribute value) may be limited to three requests per second. Rate limiting module 120 may use these rules to control the flow of requests from the devices 165 to the multi-tenant applications 135 to prevent overwhelming the network. This, in turn, can reduce costs for an OEM network 160, since a more efficient flow of requests from an OEM network 160 can prevent overcharging the OEM for excessive received requests.

Once the applicable rate limiting rules for the request have been identified, rate limiting module 120 may facilitate rate limiting by starting timers associated with the rate limiting rules for the tags on the received requests. Each timer can act to block future requests associated with a particular tag that are received before the timer expires. In some implementations, a timer can be started by creating a rate limiter timer object (also referred to herein as a rate limiter object or timer object) in a memory space of the reverse proxy service. Each rate limiter timer object may include an expiration time associated with the rate limiting rule for which the object was created.

In embodiments, the rate limiter timer objects may be reentrant objects or non-reentrant objects. In computer systems, an object or software component may be referred to as reentrant if it can be used for its primary purpose again while it is already being used for its primary purpose. In one embodiment, a non-reentrant rate limiter timer object may be an object with a single attribute—the time of its duration. Thus, a non-reentrant rate-limiter timer object may block any similarly tagged subsequent requests for the duration of its time attribute and discarded at the end if its timer duration.

In an illustrative example, when rate limiting module 120 receives a request with the IP tag and OEM tag noted above, a non-reentrant rate limiter timer object may be created that is associated with the rate limiting rule for each tag—one object with an expiration time of one second and the other object with an expiration time of a third of a second. Upon receiving a subsequent request with the same attribute values for each of the two tags, rate limiting module 120 may access rate limiter timer objects 115 to determine if there are any existing rate limiter timer objects associated with the two tags that have not yet expired. If so, the subsequent request may be rejected. If no objects have been created, or if the objects that were previously created have expired, the subsequent request may be allowed. Similarly, a new request may be received with a tag that is associated with only one of the rate limiter objects 115. In such an example, the new request would be forwarded on if the rate limiter object 115 has expired and would be rejected if the rate limiter object has not expired.

In another embodiment, a reentrant rate limiter timer object may be an object with at least two attributes—one attribute for the time of its duration, and a second attribute that is associated with a maximum number of requests that may be granted non-blocking passage. In other words, the reentrant rate limiter time object may include a maximum number of similarly tagged subsequent requests that may bypass the rate limiter timer object. Thus, a reentrant rate limiter timer object may permit additional granularity with respect to rate limit controls so that SLAs may be further fine-tuned. For example, a rate limiter timer object may be created for a duration of time (as described above) and with a number of re-entrances equal to N (where N is a positive number) to limit the rate of similarly tagged requests to N requests for the duration of the timer. The reentrant rate limiter timer object may remain active for the timer duration, and while it remains active it can allow the first N similarly tagged requests. Any additional requests (e.g., request N+1, and beyond) received while the reentrant rate limiter time object is still active may be rejected.

In some implementations, rate limiting module 120 may prevent one rate limiting rule from causing the rejection of a subsequent request that would otherwise not be rejected by another rate limiting rule. For example, a request may be received at a time before the expiration of the rate limiter timer object associated with a more restrictive rate limiting rule (e.g., for the IP tag noted above), but very near in time to the expiration of that rate limiter timer object. The request 252 could still be rejected as violating that rate limiting rule, but could cause a rate limiter timer object associated with the less restrictive rate limiting rule (e.g., for the OEM tag noted above) to be created as a result. The rate limiter timer object for the less restrictive rate limiting rule could expire after the rate limiter timer object for the more restrictive rate limiting rule, which could cause a subsequently received request containing the same tags to reject because of the timer object for the less restrictive rate limiting rule. Thus, a less restrictive rate limiting rule could cause the rejection of a request that would otherwise be allowed by a more restrictive rate limiting rule.

Rate limiting module 120 may remedy this by starting a bypass timer that expires at the same time as the timer for the less restrictive rate limiting rule. The bypass timer may be started by creating a rate limiter bypass object (also referred to herein as a timer bypass object) in the rate limiter timer objects 115 memory space. If a subsequent future request is received that includes a tag that corresponds to a more restrictive rate limiting rule, and there is not an active timer for that more restrictive rate limiting rule at the time of the subsequent request (e.g., the rate limiter timer object for that tag attribute has expired), the bypass timer can indicate to the rate limiting module 120 that the less restrictive rule should be disregarded, preventing the rejection of the otherwise allowable request. The use of the rate limiter timer objects and rate limiter bypass objects are described in further detail below with respect to FIGS. 2-3.

Embodiments discussed herein make use of illustrative examples for generating bypass timers to prevent a less restrictive rate limiting rule from causing the rejection of a subsequent request that would otherwise not be rejected by a more restrictive rule. However, in alternative embodiments, the same principles may be applied to generating a bypass timer to prevent one rate limiting rule from causing the rejection of a subsequent request regardless of the restrictiveness of the rules. For example, a bypass timer may be generated to prevent one rate limiting rule from causing the rejection of a subsequent request that would otherwise not be rejected by a second equally restrictive rule. Similarly, a bypass timer may be generated to prevent a more restrictive rate limiting rule from causing the rejection of a subsequent request that would otherwise not be rejected by a less restrictive rule.

Although for simplicity, FIG. 1 depicts a limited number of OEM networks 160, devices 165, embedded systems 170, server computing devices 130, multi-tenant applications 135, and OEM SLAs 140-145, it should be understood that network architecture can include one or more of each component.

Figure 2:
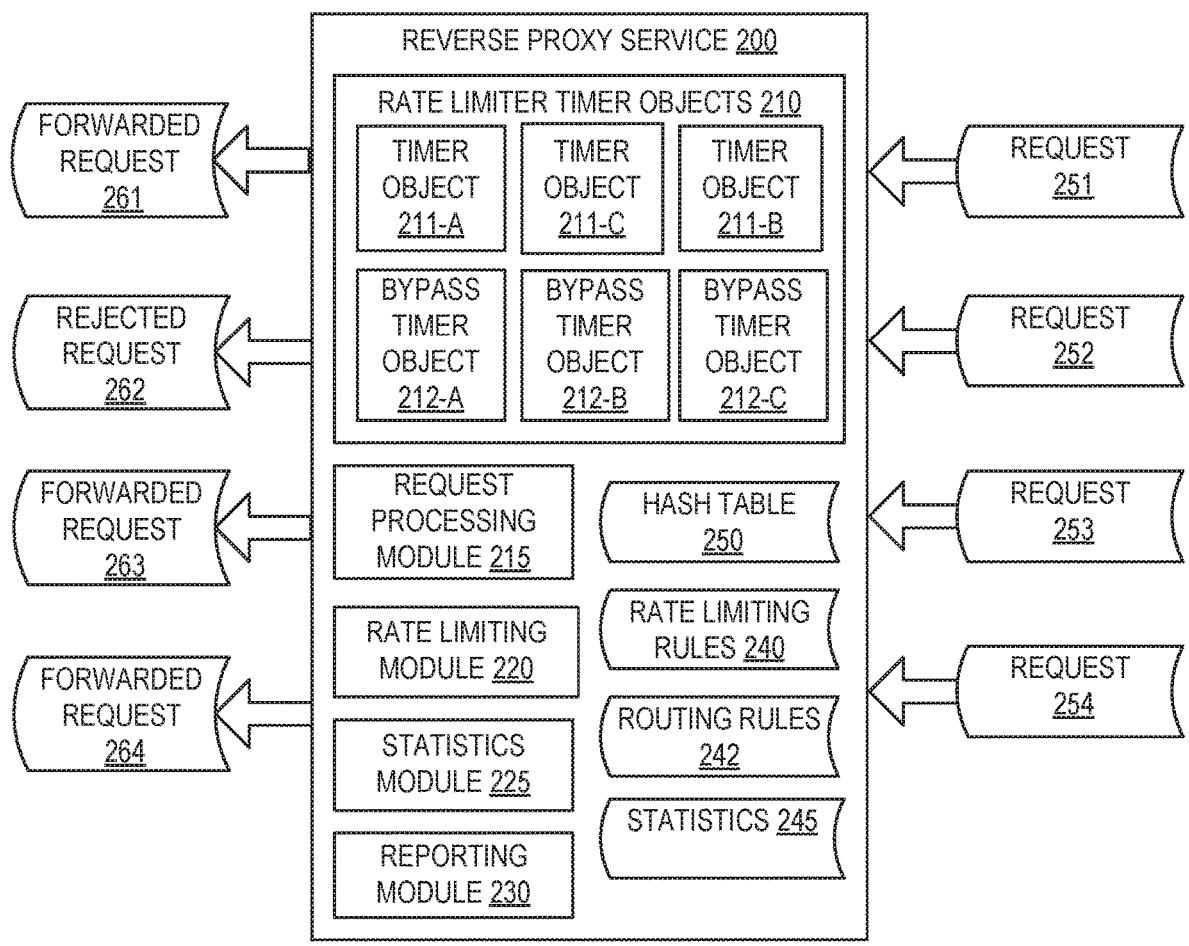
FIG. 2 is a block diagram of an example embodiment of a reverse proxy service that provides multi-tagged multi-tenant rate limiting, in accordance with an embodiment of the present disclosure.

FIG. 2 is a block diagram of an example embodiment of a reverse proxy service 200 with a rate limiting module 220, which in one embodiment corresponds to reverse proxy service 110 and rate limiting module 120 of FIG. 1. Reverse proxy service 200 may additionally include rate limiter timer objects 210, a request processing module 215, a statistics module 225, and a reporting module 230. Alternatively, the functionality of one or more of the request processing module 215, rate limiting module 220, statistic module 225, and reporting module 230 may be combined into a single module or divided into multiple sub-modules. While FIG. 2 depicts rate limiting module 220 as a component of reverse proxy service 200, in some implementations rate limiting module 220 may be separate from reverse proxy service 200. Rate limiting module 220 may be included on the same sever computing device as reverse proxy service 200, or may be included on a separate server computing device.

Request processing module 215 is responsible for receiving requests 251-254 from devices to be forwarded to one or more multi-tenant applications. In some implementations, the devices that send the requests may be devices with embedded systems. In some implementations the devices may be associated with original equipment manufacturer networks (OEM networks), where an OEM network may include multiple devices. Request processing module may receive a request 251-254 and determine, based on data tags included in the requests, whether to forward the requests to the intended destination multi-tenant application. The data tags (or, "tags") may be used to limit the rate at which received requests may be forwarded to a destination multi-tenant application. The tags may be used to rate limit any requests that are received by the reverse proxy service 200 from multiple OEMs and individual devices.

In an illustrative example, request processing module 215 may receive request 251 at a first time period. Request 251 may include one or more tags that are each associated with an attribute of the sender of the request. In some implementations, where the sender is a device with an embedded system, the attributes for the tags may be associated with the embedded system, the device, or the original equipment manufacturer (OEM) of the device. For example, a tag attribute may include an internet protocol (IP) address of the sending device, the OEM identifier, a security token identifier, a unique identifier associated with a user of the sending device, or the like.

Each tag may be associated with a rate limiting rule (stored in rate limiting rules 240) that may be used to determine whether to accept the request and forward it to its destination multi-tenant application, or to reject the request. The rate limiting rules may be used by the reverse proxy to satisfy service level agreements (SLAs) for an OEM whose devices send requests to the multi-tenant applications. For example, an SLA may specify that requests from a particular IP address may only be forwarded at a rate of one request per second. Thus, once a request is received from a device with a particular IP address, any additional requests received from the same IP address within a second of the first request may be rejected. A request containing multiple tags may be subject to multiple rate limiting rules. For example, a request with an additional tag that contains an OEM identifier may be subject to a rate limiting rule that specifies that requests from that OEM may be accepted at a rate of three requests per second. Requests from the same OEM that exceed that rate may be rejected.

A request with multiple tags can be rate limited by each of the tags, but the tag with the most restrictive rate limit may take precedence over that of a less restrictive tag. For example, using the IP tag and OEM tag combination discussed above, if a request is received from a particular device of an OEM network (having a particular IP address and OEM identifier), and a subsequent request is received from the same device (with the same IP address and OEM identifier) within the same second, the request may be rejected due to the IP address rate limit rule associated with the IP tag on the request. A subsequent request from a different device (with a different IP address) within the OEM network may not be rejected. Since the IP tag will contain a different IP address than the IP tag in the previously received request, the more restrictive IP rate limit will not apply to the subsequent request. The OEM rate limit, however, would apply to this subsequent request. If this request violates the OEM rate limit, then it would be rejected. However, if this request would not violate the OEM rate limit, it could be allowed even though it may have been received within a second of the first request. Since the IP addresses are different, the first rate limit restriction with respect to the first request may not apply.

Upon receiving a request 251 to be forwarded to a multi-tenant application, request processing module 215 may invoke rate limiting module 220 to manage the rate limiting operations of the reverse proxy service 200. Rate limiting module 220 may examine the tags on the request 251 and access rate limiting rules 240 to determine whether the request 251 should be rejected or forwarded to a multi-tenant application. Similar to the example noted above, request 251 may include one tag associated with an IP address and a second tag associated with the OEM identifier. Request processing module 215 may then access rate limiting rules 240 to identify any predefined rate limits associated with the tags.

Rate limiting rules 240 may store the rules that govern an SLA associated with a particular OEM. For example, rate limiting rules 240 may store information for the OEM SLA and that indicates that the rate limit for a particular IP address is one request per second, and the rate limit for requests received from any device associated with that OEM is three requests per second. Thus, one rate limit may be less restrictive (e.g., permit a higher rate of requests) than another. Rate limiting rules may be stored in a data store on a data storage device, in a memory space accessible to the reverse proxy service 200, or in any similar manner.

Rate limiting module 220 may then start a timer for each tag of request 251 based on the rate limit rules associated with the attributes of the tags on request 251. The timers can be used to determine whether future requests may be forwarded or rejected. Using the above example, rate limiting module 220 may start a timer associated with the IP tag of request 251 that expires after one second. Any subsequent request received from the same IP address before expiration of the timer may be rejected by rate limiting module 220. Similarly, rate limiting module 220 may also start a timer associated with the OEM tag of request 251 that expires after ⅓ of a second.

In some implementations, rate limiting module 220 may start a timer for a tag by creating a timer object 211 with an expiration time based on the rate limit rule associated with the tag. In embodiments, timer object 211 may be referred to as a timer, a timer object, a rate limiter object, a rate limiter timer object, or the like. Timer object 211 can be included in rate limiter timer objects 210. Rate limiter timer objects 210 may be stored in an area of persistent storage in a storage device, an area of memory, or the like. Rate limiter timer objects 210 may include multiple timer objects 211-A, 211-B, 211-C that may be associated with the tags of the requests that have been previously received by reverse proxy service 200. While, for simplicity, only three timer objects are depicted, it should be noted that many timer objects 211 may be stored in rate limiter timer objects 210.

As noted above with respect to FIG. 1, timer objects 211 may be non-reentrant timer objects or reentrant timer objects. A non-reentrant timer object may be created with an expiration time based on the rate limit rule associated with the corresponding tag. A reentrant timer object may be created with an expiration time based on the rate limit associated with the corresponding tag, as well as maximum number of requests that may be permitted before the expiration of the timer (e.g., while the timer is active). Any additional requests received in excess of this maximum number may be rejected.

In an illustrative example, rate limiting module 220 may create timer object 211-A that is associated with the IP tag for request 251, which may expire after one second. Similarly, rate limiting module 220 may create a timer object 211-B that is associated with the OEM tag for request 251, which may expire after ⅓ of a second. Thus, timer object 211-B can be started using a rate limit that is higher than that of object 211-A. To manage the timer objects associated with the tags, rate limiting module 220 may create an entry in a hash table for a tag and associate the entry with the timer object. For example, an entry in the hash table can refer to an IP address and its associated timer object. Thus, if a subsequent request is received with the same IP address, rate limiting module 220 may use the IP address from the subsequent request to access the hash table, and determine if there is an active timer object for the IP address. If so, the request may be rejected depending on the type of timer object. If the timer object is a non-reentrant timer object, the request may be rejected if the timer is still active. If the timer object is a reentrant timer object, the request may be rejected if the maximum number of allowed requests for that timer object has been exceeded. If the maximum number has not yet been met, then the request may be allowed. If the timer object has expired, rate limiting module 220 may allow the request to be forwarded to a multi-tenant application, or may reject the request, depending on the state of other timers that are associated with other tags in the request.

If rate limiting module 220 determines that there are no active timer objects 211 (e.g., timer objects that have expired) associated with the tags included in request 251, rate limiting module 220 may forward the request (e.g. forwarded request 261) to its destination multi-tenant application. In some implementations, the request may be forwarded to its destination by first determining a routing rule associated with the request. The routing rule may be a rule stored in routing rules 242 that identifies a destination for the request based on contents of the request (e.g., based on a header and/or body of the request). The destination for the request may be determined by an application identifier (ID), an IP address, a domain name system (DNS) address, or other similar information. Routing rules 242 may be indexed by one or more of the attributes used in the tags of the received request and may be configured uniquely for different OEMs, devices, embedded systems, etc. For example, the routing rules may be stored using the IP address of the embedded system associated with the request, the OEM identifier, the token identifier, or the like. In some implementations, the request may include information that identifies the intended destination. For example, the domain name associated with the destination multi-tenant application, a port number associated with the multi-tenant application, etc.

Rate limiting module 220 may then receive a second request 252 at a time that occurs after the time request 251 was received. In some embodiments, request 252 may be received from the same embedded system that sent request 251. In other embodiments, request 252 may be received from a different embedded system. In one embodiment, request 252 may include the same tags as request 251 (e.g., containing the same IP address and OEM identifier attributes). Rate limiting module 220 may determine whether to forward or reject request 252 by first determining if there are any timer objects 211 in rate limiter timer objects 210 associated with either of the tags in request 252. Rate limiting module 220 can access hash table 250 with the tag information from request 252 and determine whether there are any unexpired timer objects that could cause the request 252 to be rejected.

In an illustrative example, if request 252 was received less than a second after request 251, rate limiting module may look up the IP address from hash table 250 and find that an entry already exists for that IP address, indicating that a timer object 211-A has been created. Rate limiting module 220 may then check the expiration time of timer object 211-A (for both non-reentrant and reentrant timers) to determine if the timer object 211-A has expired. In implementations where the timer objects are non-reentrant, if the time that request 252 has been received is before the expiration time, request 252 may be rejected based on timer object 211-A. In implementations where the timer objects are reentrant, the maximum number of allowed requests for that timer object may additionally be checked. If any other requests have been received between request 251 and request 252, and that number is less than the maximum number allowed, request 252 may be permitted. If the number of other requests meets or exceeds the maximum number allowed, request 252 may be rejected.

Responsive to determining that request 252 violates the rate limit for the attribute of the IP tag (e.g., based on the rate limit for that IP address), request 252 may be rejected (e.g., rejected request 262). As noted above, the rate limit for a non-reentrant timer may be violated if the request is received before the expiration of the timer. The rate limit for a reentrant timer may be violated if the request is received before the expiration of the timer, and the maximum number of allowed requests for that timer has been met or exceeded. Rate limiting module 220 may reject a request by sending a return code to the requesting device, storing the request in a queue for later processing, dropping the request from further processing, or the like.

Rate limiting module 220 may also determine if request 252 violates a rate limit rule for any other tag attribute in the request. To do so, rate limiting module 220 may determine whether there are any active timer objects associated with any other tags for request 252 using hash table 250. If no other timer objects 211 are active for the other tags for request 252, then rate limiting module 220 may then start a timer (e.g. create a new timer object 211) for that tag. For example, if request 252 is received less than a second after request 251, but more than ⅓ of a second after request 251, request 252 could violate the rate limit rule for the IP address tag (1 per second), but not the rate limit rule for the OEM indicator tag (3 per second). The timer object 211 associated with the OEM tag of request 251 could have expired, so a new timer object 211 may be created (e.g., a new timer may be started) for the OEM tag of request 252, which can be used to limit subsequent requests from the same OEM.

As noted above with respect to FIG. 1, in some implementations, rate limiting module 220 may prevent a less restrictive rate limiting rule from causing the rejection of a subsequent request that would otherwise not be rejected by a more restrictive rule. Referring to the examples above, request 252 may be received at a time before the expiration of the timer object 211 associated with the IP rate limit rule of the first request (e.g., less than a second after request 251), but very near in time to the expiration of that timer object 211. Request 252 could still be rejected as violating that rate limit rule, and could cause the timer object 211 associated with the OEM tag to be created as a result (if no other OEM timer objects 211 are still active). The timer object 211 for the OEM tag of request 252 (the less restrictive rate limiter) could expire after the timer object 211 for the IP tag of request 251 (the more restrictive rate limiter), which could cause a subsequently received request containing the same IP and OEM tags to reject because of the timer object for the OEM tag of request 252. Thus, a less restrictive rate limiter could cause the rejection of a request that would otherwise be allowed by a more restrictive rate limiter.

Rate limiting module 220 can remedy this by starting a bypass timer associated with the less restrictive rate limit timer that can be used by rate limiting module 220 to disregard the less restrictive timer when receiving subsequent requests that would be permitted by the more restrictive rate limit rule. If a subsequent future request is received that includes a tag that corresponds to a more restrictive rate limit rule, and there is not an active timer for that more restrictive rule at the time of the subsequent request (e.g., the timer object for that tag attribute has expired), the bypass timer can indicate to the rate limiting module 220 that the less restrictive rule should be disregarded. Rate limiting module 220 can start the bypass timer by creating a rate limiter bypass object (e.g., bypass timer object 212) in rate limiter timer objects 210.

The bypass timer object 212 may reference at least two timer object(s) 211 for the tags of request 252. Specifically, the bypass timer object 212 references the less restrictive timer object that is created at the same time as the bypass timer object as well as the more restrictive timer object that caused the request 252 to be rejected. For example, if request 252 included only the IP tag and the OEM tag, a single bypass timer object 212 may be created that references the timer object 211 for the OEM tag of request 252 (e.g., the less restrictive rate limiting rule of request 252) and the timer object 211 for the IP tag of request 251 (e.g., the more restrictive rate limiting rule of request 251). In implementations where request 252 has a third tag (e.g., a user identifier (ID) tag, for example) that also has a more restrictive rate limiting rule than the rate limiting rule for the OEM tag (e.g., a rate limit of two per second), an additional bypass timer object 212 may be created for the OEM tag to reference the timer object 211 created for the user ID tag. Alternatively, a single bypass timer object 212 may be created that references each of the timer objects with more restrictive rate limiting (e.g., both the IP timer object and the OEM timer object). Upon expiration of the user ID timer object, subsequent requests that would otherwise satisfy the user ID rate limit rule should not be rejected. The bypass timer object 212 can include an expiration time that is the same as the expiration time of the timer object 211 for the OEM tag of request 252. Thus, the less restrictive timer object 211 and its associated bypass timer object 212 can expire at the same time, so that the bypass timer object 212 should not impact any other timer object 211.

For example, rate limiting module 220 may receive a third request 253 at a time that occurs after the time that request 252 was received. In one embodiment, request 253 may include the same tags as requests 251 and 252 (e.g., containing the same IP address and OEM identifier attributes). Rate limiting module 220 may then follow similar steps to those described above for request 252 to determine if there are any timer objects 211 in rate limiter timer objects 210 associated with either of the tags in request 253. Rate limiting module 220 can again access hash table 250 with the tag information from request 253 and determine whether there are any unexpired timer objects 211 that could cause the request 253 to be rejected. Rate limiting module may also determine if there are any unexpired bypass timer objects 212 that could cause a timer object 211 to be bypassed.

If request 253 is received more than a second after request 251, but less than a third of a second after request 252, rate limiting module 220 may determine that request 253 violates the rate limit for the OEM tag (the less restrictive rate limit) but does not violate the rate limit for the IP tag (the more restrictive rate limit). Rate limiting module 220 may make this determination by first determining that the timer object 211 created by request 251 that is associated with the IP address in the IP tag of request 253 has expired, but the timer object 211 created by request 252 that is associated with the OEM identifier in the OEM tag of request 253 has not expired. Rate limiting module 220 may then determine that the timer object 211 associated with the OEM identifier is to be bypassed by determining that the bypass timer object 212 that references the unexpired OEM timer object 211 has not expired. Once rate limiting module 220 has determined that the timer object associated with the less restrictive rule is to be bypassed, request 253 may be forwarded to its destination (e.g., forwarded request 263).

In an alternative example, request 253 may include the OEM tag, but not the IP tag. Rate limiting module 220 may determine that the timer object 211 associated with the OEM identifier should not be bypassed, even though an associated bypass timer object 212 has not expired. Since the bypass timer references both the OEM timer object 212 and the IP timer object 212, any subsequent request that does not include both the OEM tag and the IP tag may not be eligible to utilize the bypass timer object 212. In this example, the OEM tag is associated with the most restrictive rate limit for the request, so the rate limiting rule for the OEM tag would still apply. Thus in this alternative example, request 253 should be rejected.

Rate limiting module 220 may receive a fourth request 254 at a time that occurs after the time that request 253 was received. In some implementations, request 254 may include the less restrictive tag but not the more restrictive tag. For example request 254 may include the OEM tag, but not the IP tag. Rate limiting module may determine that at the time that request 254 is received, the timer object 211 associated with the OEM tag from request 252 has expired, but the timer object 211 associated with the IP tag from request 253 has not expired. Since request 254 does not include an IP tag, any active timer objects associated with IP tags can be disregarded. Rate limiting module 220 may then start a new timer for the OEM tag of request 254 (e.g., create a new timer object 211, or restart the timer of the existing timer object 211 associated with the OEM id in the hash table). Rate limiting module 220 may subsequently forward the request to its destination (e.g., forwarded request 264).

Statistics module 225 may be responsible for collecting diagnostic information regarding the timer objects 211, bypass timer objects 212, received requests, etc. Statistics module 225 may be invoked by request processing module 215 to track received requests, whether or not the requests were forwarded, reasons for request rejection (e.g., error codes, violated rate limit rules, etc.), average rate of rejection, as well as time stamp information describing receive time, forward time, reject time, or the like. Statistics module 225 may additionally scan the contents of hash table 250 and rate limiter objects 210 to monitor the number of objects created, the size of the memory space containing the timer objects, etc. Any statistical information collected by statistics module 225 may be stored in statistics 245.

Reporting module 230 may use the information stored in statistics 245 to produce diagnostic reports to identify potential problems in the system, optimize throughput, or customize rate limiting rules. In some implementations, reporting module 230 may determine a number of requests from a device that have been rejected over a particular time period based on the rate limit rules associated with tags in the request. For example, reporting module 230 may determine the number of request rejected over a 10 minute time period based on the rate limit rules associated the IP tag and the OEM tag in the requests. If reporting module 230 determines that the number of rejected requests over the time period exceeds a threshold, reporting module 230 may automatically adjust at least one of the rate limits associated with the rejected requests. Alternatively, reporting module 230 may store the recommended adjustments in statistics 245.

Figure 3:
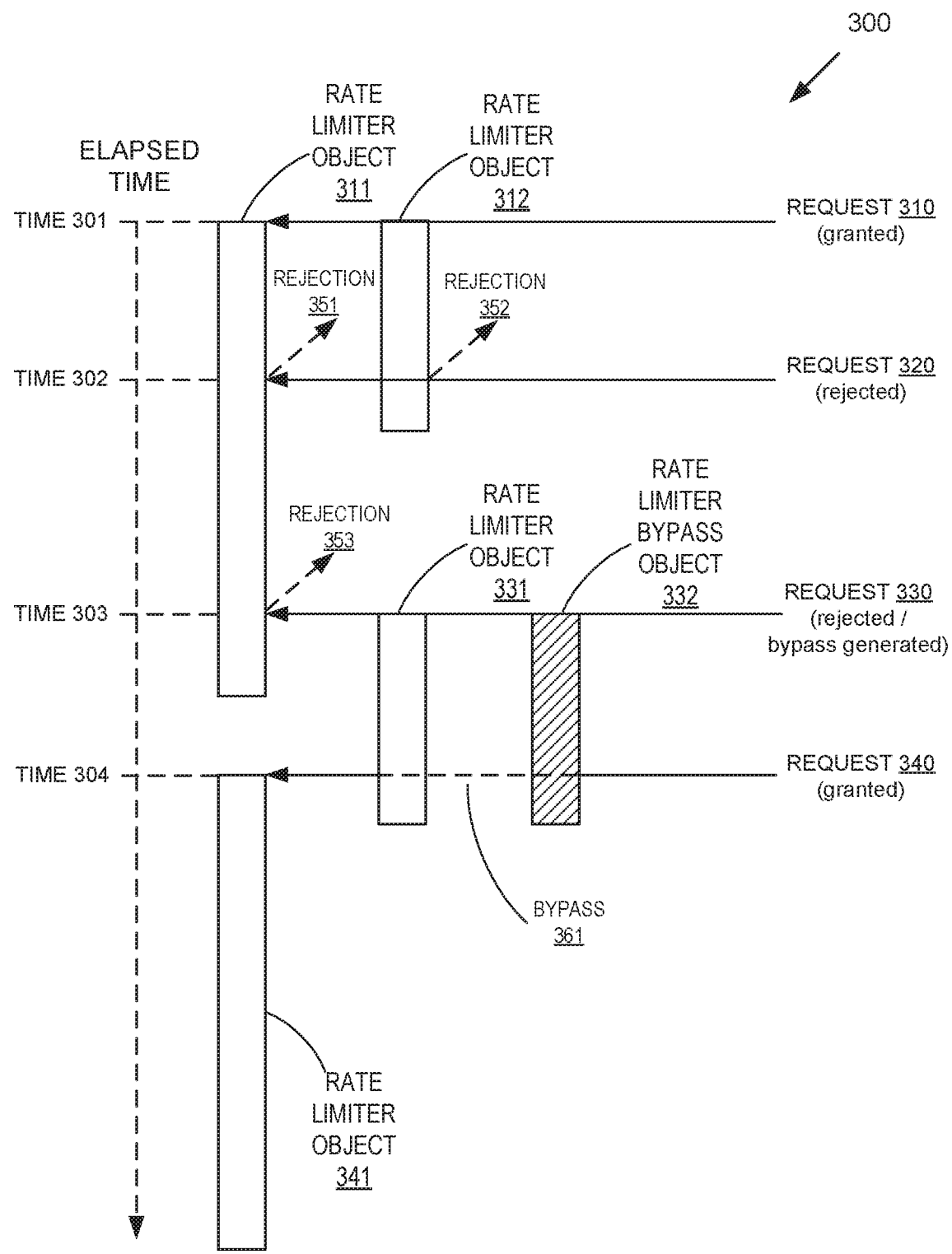
FIG. 3 is a timing diagram that illustrates performing multi-tagged multi-tenant rate limiting, in accordance with an embodiment of the present disclosure.

FIG. 3 is a timing diagram 300 that illustrates performing multi-tagged multi-tenant rate limiting in accordance with an embodiment of the present invention. The timing diagram 300 depicts the creation of rate limiter objects (timer objects) that can be used by a reverse proxy rate limiting module (such as that described above with respect to FIGS. 1-2) to rate limit requests received from devices to be forwarded to multi-tenant applications. In embodiments, the rate limiter objects depicted in FIG. 3 may be non-reentrant (e.g., timer-based) or reentrant (e.g., combination of a timer and a maximum number of requests that may be permitted before the expiration of the timer).

At time 301, the rate limiting module may receive request 310. The rate limiting module may identify routing rules associated with tags in request 310 and create rate limiter objects in a memory space (e.g., of the reverse proxy) to be used as timers to facilitate rate limiting for future requests. Rate limiter object 311 may be created for a tag in request 310 that is associated with a more restrictive rate limiting rule (e.g., specifying a rate limit of one request per second). Rate limiter object 312 may be created for a tag in request 310 that is associated with a less restrictive rate limiting rule (e.g., specifying a rate limit of three requests per second). As shown in FIG. 3, no other rate limiter objects exist at time 301 associated with either of the tags in request 310, so request 310 may be granted and forwarded to its intended destination (e.g., a multi-tenant application that is rate limited by the reverse proxy).

At a later time 302, the rate limiting module may receive request 320. The rate limiting module may determine whether there are any rate limiter objects in the memory space (e.g., whether there are any active timers) associated with the tags in request 320. As shown in FIG. 3, time 302 occurs at a point in time that is before the expiration of both rate limits for the two tags (e.g., less than a third of a second after time 301). Both rate limiter objects 311 and 312 that were created for request 310 are still active (e.g., have not yet expired) at time 302. The rate limiting module may access a hash table to determine that rate limiter objects 311 and 312 have been created and their associated expiration times have not yet been reached. The rate limiting module may then determine that request 320 should be rejected. In some implementations, the rate limiting module may analyze the rate limits for each tag independently, and may therefore reject request 320 for each rate limiter object independently. Thus, the active rate limiter object 311 may cause rejection 351, and the active rate limiter object 312 may cause rejection 352.

In implementations where rate limiter objects 311 and 312 are non-reentrant, the fact that the expiration times have not yet been reached may be sufficient to determine that request 320 should be rejected. In implementations where rate limiter objects 311 and 312 are reentrant, the request may be rejected if the maximum number of requests for those timer objects has been met or exceeded. For example, if the number of additional requests had been received between times 301 and 302 (not pictured) exceeded a maximum threshold associated with rate limiter object 311, request 320 may be rejected. On the other hand, if the number of additional requests received between times 301 and 302 had not yet met the maximum threshold, then request 320 might be allowed.

At a later time 303, the rate limiting module may receive request 330. As shown in FIG. 3, time 303 occurs at a point in time that is before the expiration of the most restrictive rate limit (e.g., the one per second limit for the first tag), but that is after the expiration of the less restrictive rate limit (e.g., the three per second limit for the second tag). The rate limiter object 311 that was created for request 310 is still active (e.g., has not expired), but rate limiter object 312 that were created for request 310 is no longer active (e.g., has expired) at time 303. Thus, the active rate limiter object 311 may cause rejection 353, and no new rate limiter object will created for the more restrictive rate limit for request 330.

Since rate limiter object 312 has expired prior to time 303, the rate limiting module may create a new rate limiter object 331 (e.g., start a new timer) for the less restrictive rate limit associated the second tag in request 330 to rate limit future requests that include the second tag. The rate limiter module may also create a rate limiter bypass object 332 (e.g., a bypass timer) that references both the rate limiter object 331 and the rate limiter object 311. The rate limiter bypass object 332 may be created such that it expires at the same time as rate limiter object 331. The rate limiter bypass object 332 may be used to prevent any future requests from rejecting because of rate limiter object 331 (the less restrictive rate limit) when they would otherwise be allowed by the more restrictive rule (e.g., at a time after rate limiter object 311 expires).

For example, at later time 304, the rate limiter module may receive request 340 that occurs at a point in time that is after the expiration of rate limiter object 311 (the more restrictive rate limit), but before the expiration of object 331 (the less restrictive rate limit). The rate limiter module may determine that rate limiter object 331 has an associated rate limiter bypass object 332 that is still active, and therefore may bypass rate limiter object 331 (bypass 361) to grant request 340 and forward it to its destination. Rate limiter object 341 could then be created associated with the more restrictive rate limit for request 340. A new rate limiter object for the less restrictive rate limit may not be created for request 340 since rate limiter object 331 is still active at time 304.

FIGS. 4-11 are flow diagrams showing various methods for multi-tagged multi-tenant rate limiting. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a computing device executing a rate limiting module, such as rate limiting module 120 of reverse proxy service 110 in FIG. 1 and/or rate limiting module 220 of reverse proxy service 200 in FIG. 2.

Figure 4:
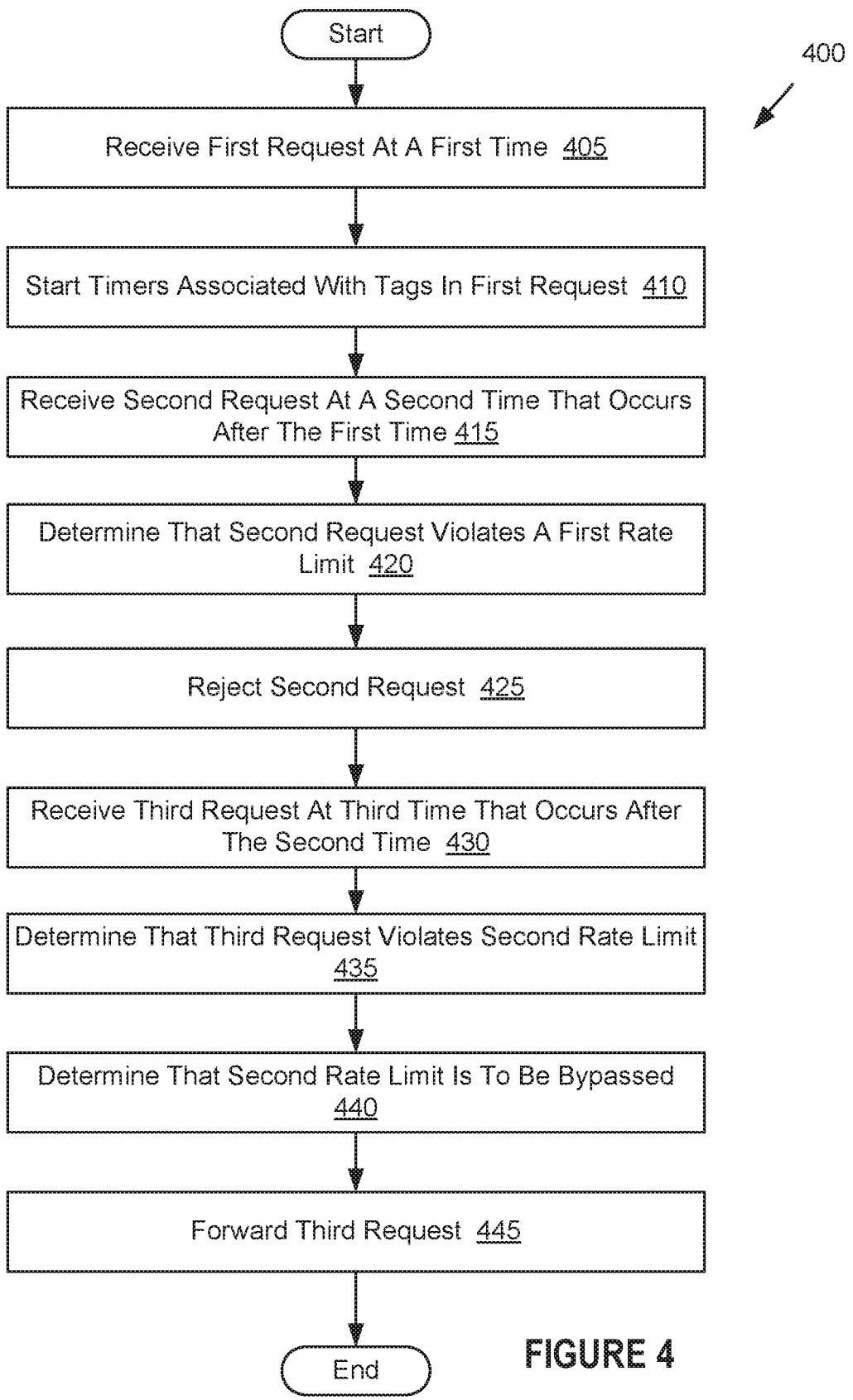
FIG. 4 is a flow chart of an example method for performing multi-tagged multi-tenant rate limiting, in accordance with an embodiment of the present disclosure.

FIG. 4 is a flow chart of an example method 400 for performing multi-tagged multi-tenant rate limiting. At block 405 of method 400, processing logic receives a first request at a first time. In some implementations the first request may include a first tag associated with a first attribute and a second tag associated with a second attribute. At block 410, processing logic starts timers associated with the tags in the first request received at block 405. For example, processing logic may start a first timer for the first tag based on a first rate limit associated with the first attribute, and a second timer for the second tag based on a second rate limit associated with the second attribute. In some implementations, the second rate limit may be higher (e.g., less restrictive) than the first rate limit. One embodiment of starting a timer is set forth below with reference to FIG. 5.

At block 415, processing logic receives a second request at a second time that occurs after the first time of the first request. In some implementations, the second request my also include the first tag and the second tag. At block 420, processing logic determines that the second request violates the first rate limit. In implementations where the timer is a non-reentrant timer, processing logic may make this determination by determining that at the second time, the second timer has expired and the first timer has not expired. One embodiment of determining whether a timer has expired is set forth below with reference to FIG. 6. In implementations where the timer is a reentrant timer, processing logic may determine that the second request violates the first rate limit by additionally determining whether any additional requests have been received between the first time and the second time. If so, and processing logic determines that the total number of requests (the additional requests plus the second request received at block 415) meets a maximum threshold value associated with the first attribute, the second request may violate the first rate limit. At block 425, processing logic rejects the second request. In rejecting the request, processing logic may start a third timer for the second tag of the second request based on the second rate limit. In some implementations, processing logic may also start a bypass timer associated with the third timer that expires at the same time as the third timer.

At block 430, processing logic receives a third request at a third time that occurs after the second time of the second request. In some implementations, the third request may also include the first tag and the second tag. At block 435, processing logic determines that the third request violates the second rate limit. Processing logic may make this determination by determining that at the third time, the first timer has expired and the third timer has not expired.

At block 440, processing logic determines that the second rate limit is to be bypassed. In some implementations, processing logic makes this determination by first determining that the bypass timer has not expired, then starting a fourth timer for the first tag of the third request based on the first rate limit. At block 445, processing logic forwards the third request. In some implementations the third request is forwarded to a multi-tenant application. One embodiment of forwarding a request to a multi-tenant application is set forth below with reference to FIG. 7. After block 445, the method of FIG. 4 terminates.

Figure 5:
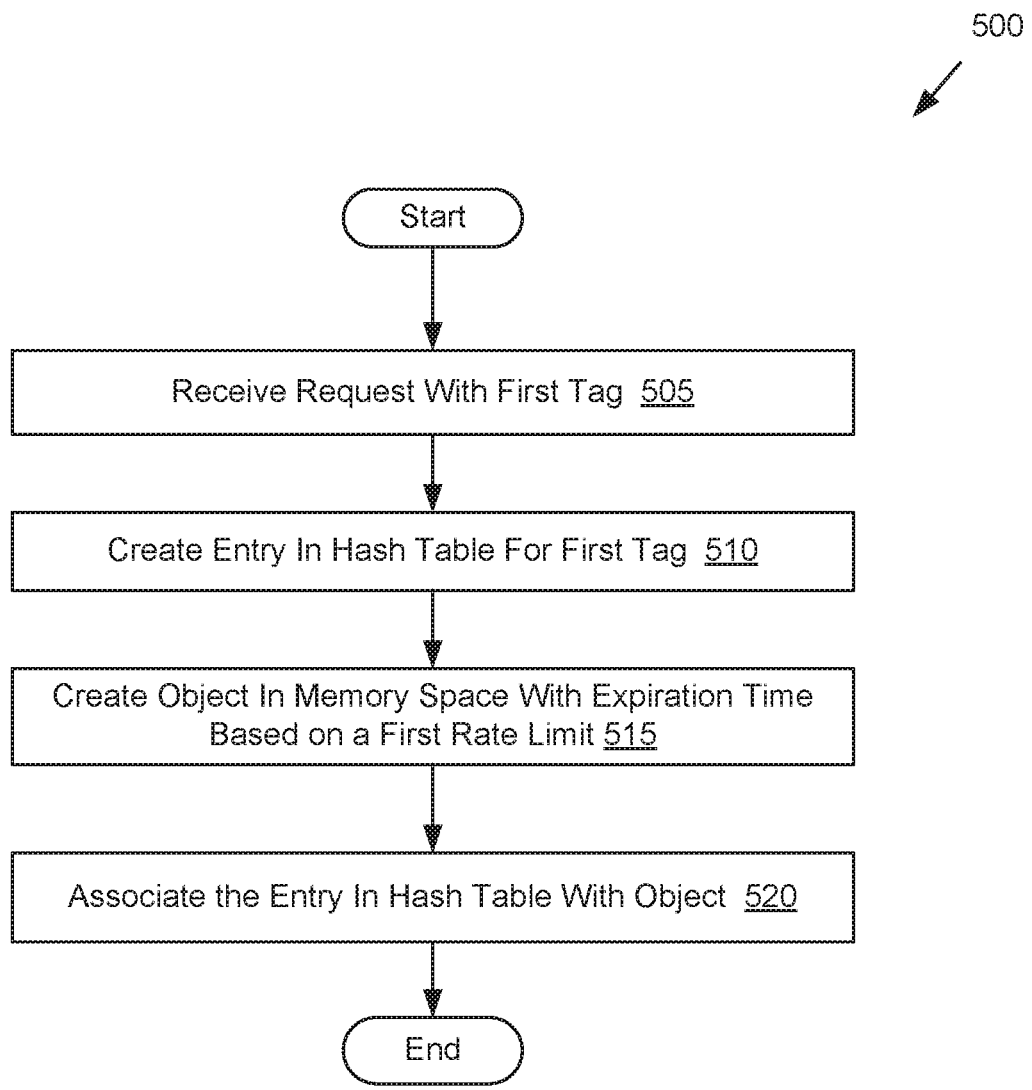
FIG. 5 is a flow chart of an example method for starting a timer associated with a rate limit, in accordance with an embodiment of the present disclosure.

FIG. 5 is a flow chart of an example method 500 for starting a timer associated with a rate limit. At block 505 of method 500, processing logic receives a request with a first tag. In some implementations the request may be received as described above with respect 405 of FIG. 4. At block 510, processing logic create an entry in a hash table for the first tag. At block 515, processing logic create an object in a memory space, where the object has an expiration time based on a first rate limit associated with the first tag. At block 520, processing logic associates the entry in the hash table with the object in the memory space created at block 515. After block 520, the method of FIG. 5 terminates.

Figure 6:
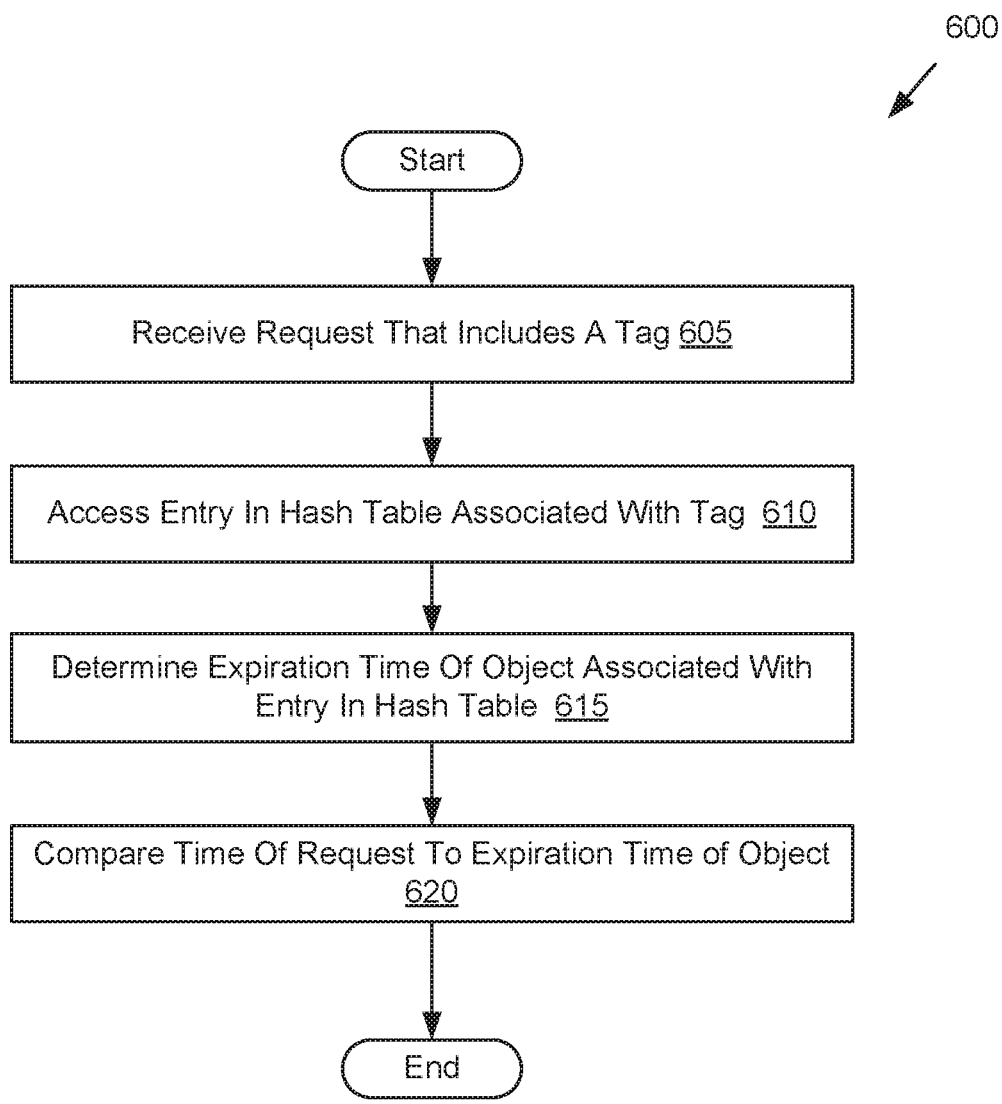
FIG. 6 is a flow chart of an example method for determining whether a timer has expired, in accordance with an embodiment of the present disclosure.

FIG. 6 is a flow chart of an example method 600 for determining whether a timer has expired. At block 605 of method 600, processing logic receives a request that includes a tag. In some implementations the request may be the request received at block 405 of FIG. 4. At block 610, processing logic accesses an entry in a hash table associated with the tag. The entry in the hash table can be associated with a timer object in memory, such as that created at block 515 of FIG. 5. At block 615, processing logic determines the expiration time of the object associated with the entry in the hash table. At block 620, processing logic compares the time that the request was received at block 605 to the expiration time of the object. If the expiration time is after the time of the request, then processing logic may determine that the timer has not yet expired. If the expiration time is before the time of the request, then processing logic may determine that the timer has expired. After block 620, the method of FIG. 6 terminates.

Figure 7:
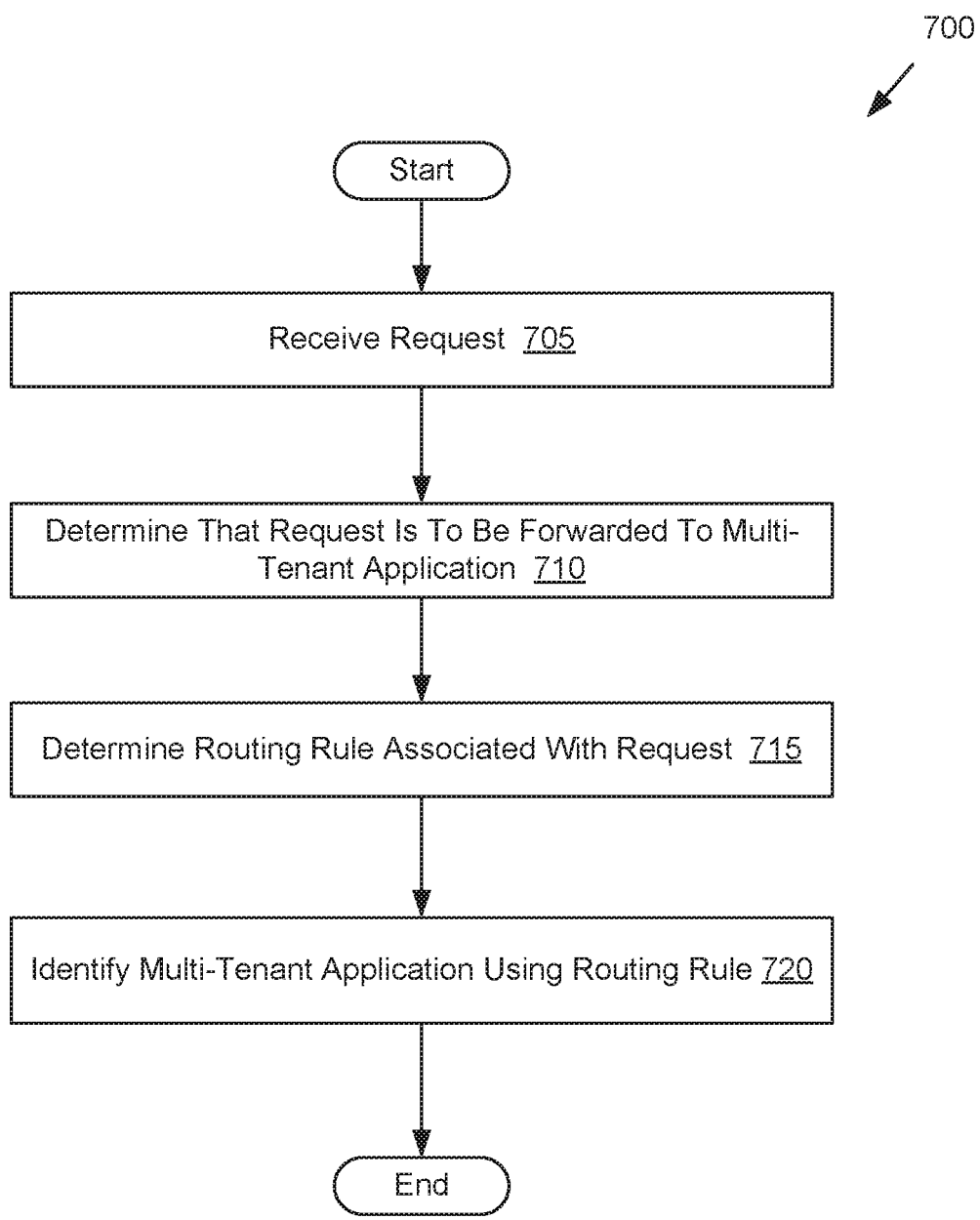
FIG. 7 is a flow chart of an example method for forwarding a request, in accordance with an embodiment of the present disclosure.

FIG. 7 is a flow chart of an example method 700 for forwarding a request. At block 705 of method 700, processing logic receives a request. In some implementations the request may be the request received at block 405 of FIG. 4. At block 710, processing logic determines that the request is to be forwarded to a multi-tenant application. At block 715, processing logic determines a routing rule associated with the request. At block 720, processing. After block 720, the method of FIG. 7 terminates.

Figure 8:
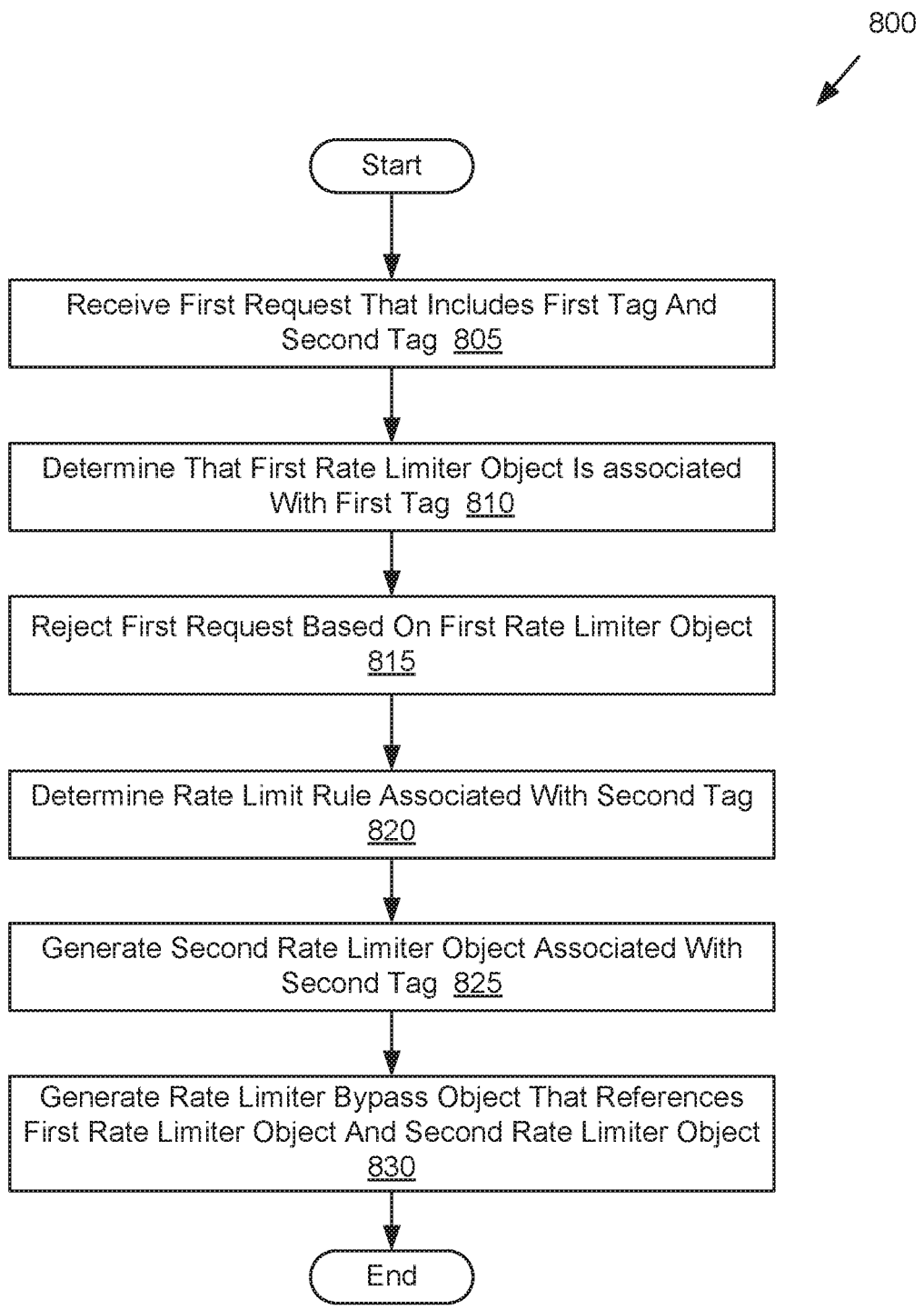
FIG. 8 is a flow chart of an example method for, in accordance with an embodiment of the present disclosure.

FIG. 8 is a flow chart of an example method 800 for performing multi-tagged multi-tenant rate limiting with a bypass timer. At block 805 of method 800, processing logic receives a first request that includes a first tag and a second tag. In some implementations the first tag may be associated with a first attribute and a second tag associated with a second attribute. At block 810, processing logic determines that a first rate limiter object is associated with the first tag. In some implementations, the first rate limiter object may include a first expiration time and may have been generated based on a first rate limit rule associated with the first tag in the first request received at block 805. At block 815, processing logic rejects the first request based on the first rate limiter object.

At block 820, processing logic determines a second rate limit rule associated with the second tag. In some implementations, the first rate limit rule is more restrictive than the second rate limit rule. For example, the first rate limit rule may limit requests associated with the first tag to one per second, and the second rate limit rule may limit requests with the second tag to three per second. At block 825, processing logic generates a second rate limiter object associated with the second tag. In some implementations, the second rate limiter object includes a second expiration time.

At block 830, processing logic generates a rate limiter bypass object that references the first rate limiter object and the second rate limiter object. In some implementations, the rate limiter object includes the second expiration time. The rate limiter bypass object may be used to prevent the second rate limiter object from causing a future request to be rejected responsive to satisfaction of one or more criteria. In some implementations, the one or more criteria may include a first criterion that the future request includes the first tag and the second tag, a second criterion that the first limiter object has expired at a time that the future request is received, and a third criterion that the second rate limiter object has not expired at the time that the future request is received. After block 830, the method of FIG. 8 terminates.

Figure 9:
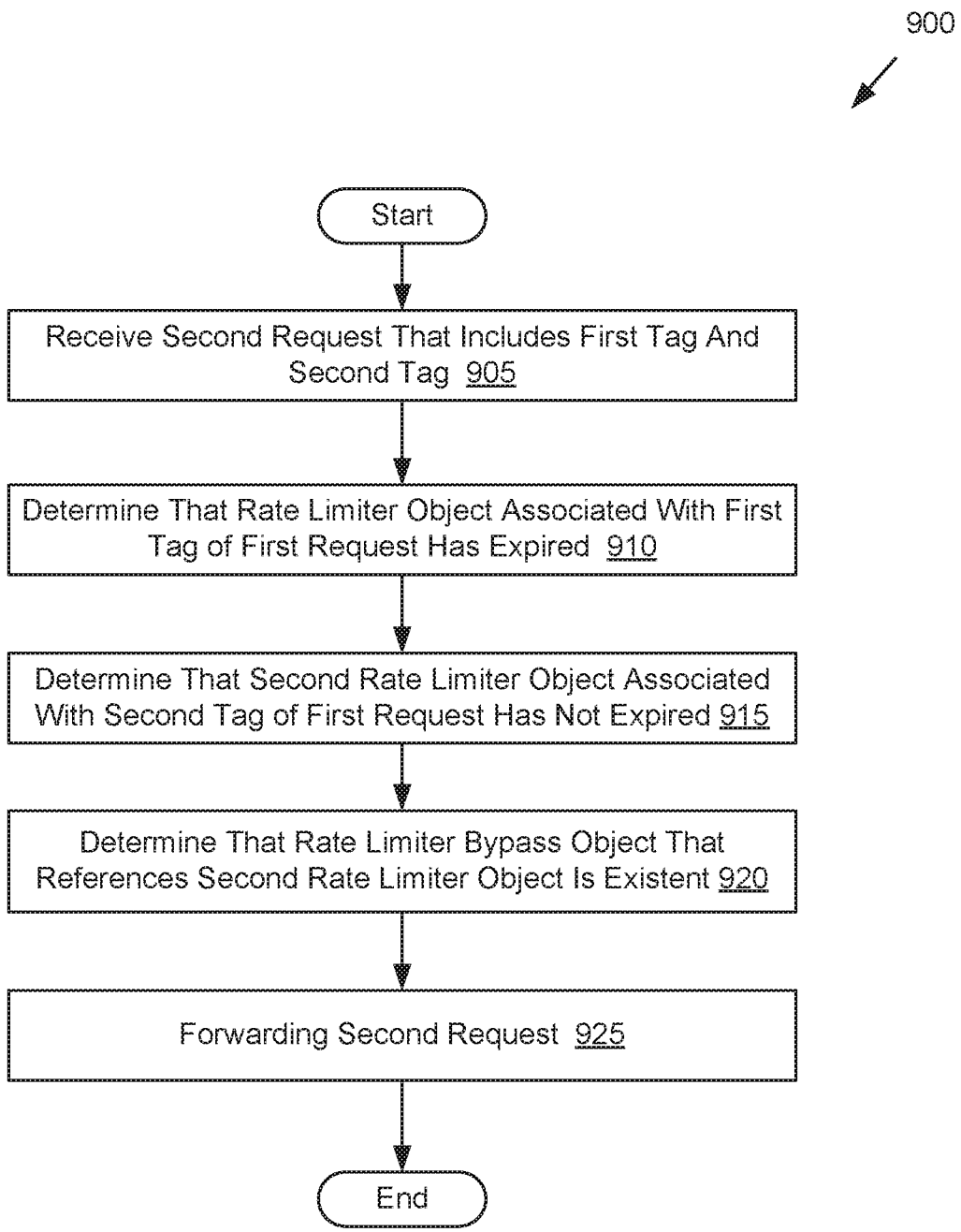
FIG. 9 is a flow chart of an example method for forwarding a request based on a bypass timer, in accordance with an embodiment of the present disclosure.

FIG. 9 is a flow chart of an example method 900 for forwarding a request based on a bypass timer. At block 905 of method 900, processing logic receives a second request that includes a first tag and a second tag. In some implementations, the first tag and the second tag have the same attributes as the first tag and second tag received in the first request at block 805 if FIG. 8. At block 910, processing logic determines that the first rate limiter object associated with the first tag of the first request has expired. In some implementations, processing logic may compare the expiration time associated with the first rate limiter object to the time that the second request was received. If the expiration time of the first rate limiter object is a time that occurred before the time the second request was received, then processing logic may determine that the first rate limiter object has expired.

At block 915, processing logic determines that second rate limiter object has not expired. In some implementations, processing logic may compare the expiration time associated with the second rate limiter object to the time that the second request was received. If the expiration time of the second rate limiter object is a time that occurs after the time the second request was received, then processing logic may determine that the second rate limiter object has not expired.

At block 920, processing logic determines that the rate limiter bypass object that references the second rate limiter object is existent. In some implementations, processing logic may access a hash table using the attributes for the second tag to identify any objects stored in a memory space. Processing logic may identify both the rate limiter object and the rate limiter bypass object as both objects may be generated using the same tag attributes. The existence of an active rate limiter bypass object may indicate that the second rate limiter object may be bypassed even though it has not yet expired. At block 925, processing logic forwards the second request. After block 925, the method of FIG. 9 terminates.

Figure 10:
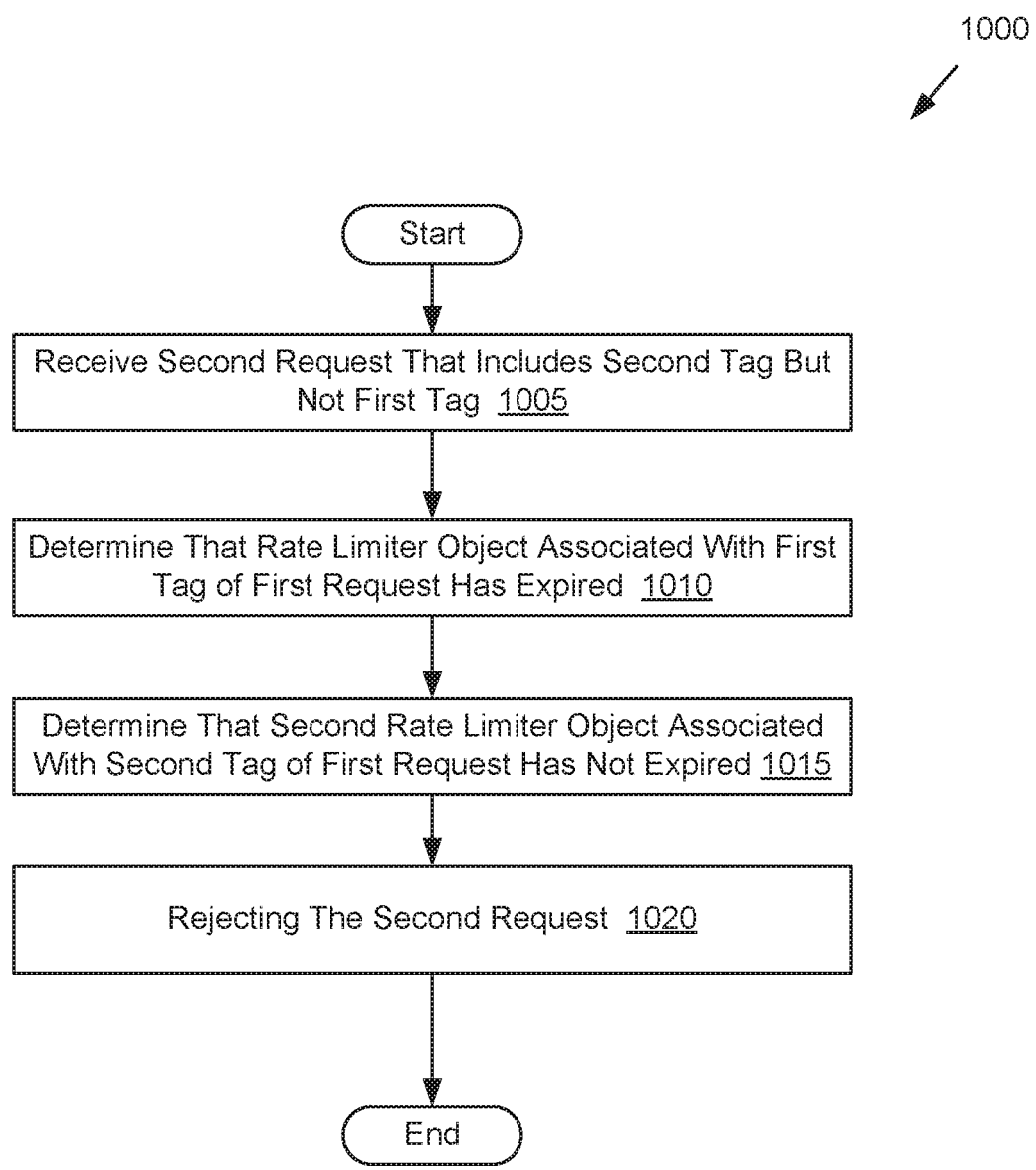
FIG. 10 is a flow chart of an example method for rejecting a request, in accordance with an embodiment of the present disclosure.

FIG. 10 is a flow chart of an example method 1000 for rejecting a request. At block 1005 of method 1000, processing logic receives a second request that includes a second tag but not a first tag. In some implementations, the second tag has the same attribute as the second tag received in the first request at block 805 if FIG. 8. At block 1010, processing logic determines that a rate limiter object associated with the first tag of the first request has expired. In some implementations, processing logic may compare the expiration time associated with the first rate limiter object to the time that the second request was received. If the expiration time of the first rate limiter object is a time that occurred before the time the second request was received, then processing logic may determine that the first rate limiter object has expired.

At block 1015, processing logic determines that the second rate limiter object associated with the second tag of the first request has not expired. In some implementations, processing logic may compare the expiration time associated with the second rate limiter object to the time that the second request was received. If the expiration time of the second rate limiter object is a time that occurs after the time the second request was received, then processing logic may determine that the second rate limiter object has not expired. At block 1020, processing logic rejects the second request. After block 1020, the method of FIG. 10 terminates.

Figure 11:
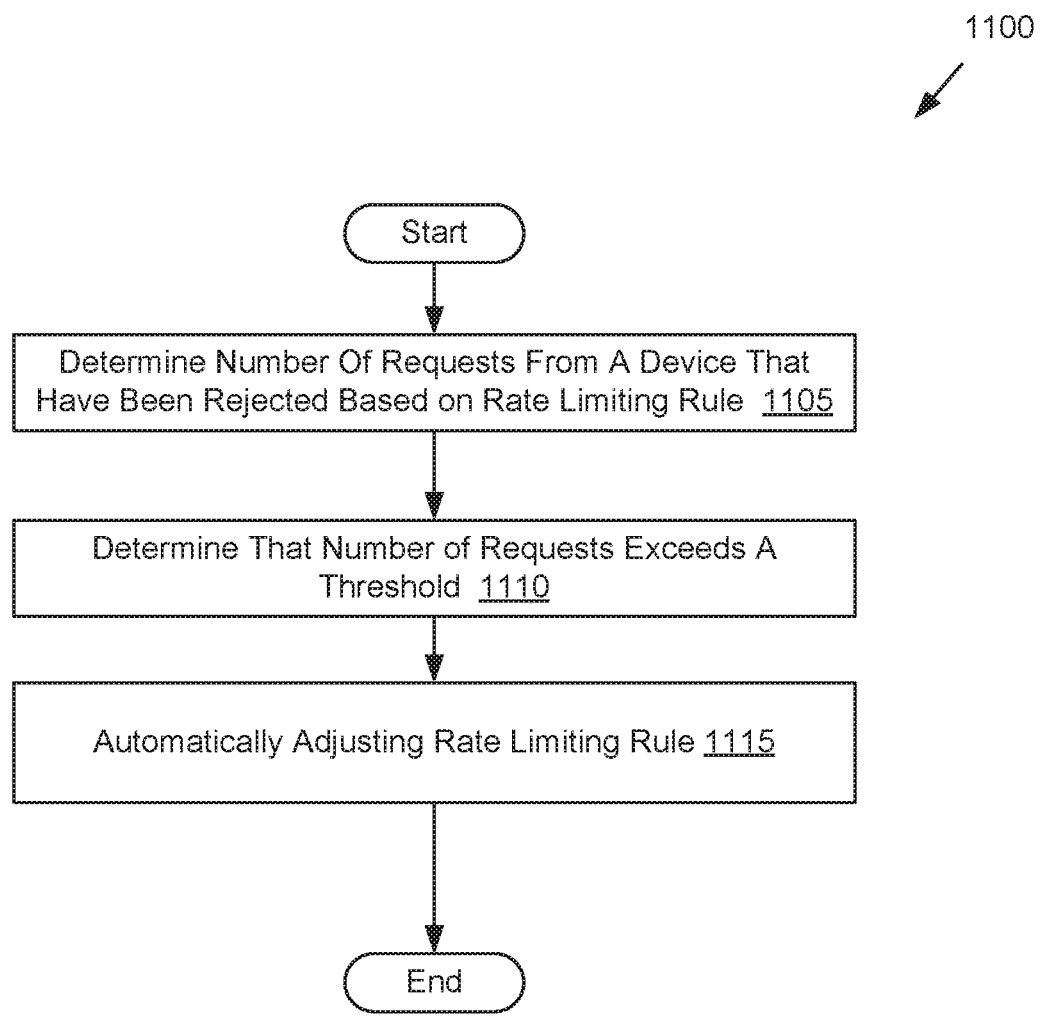
FIG. 11 is a flow chart of an example method for automatically adjusting a rate limit rule, in accordance with an embodiment of the present disclosure.

FIG. 11 is a flow chart of an example method 1100 for automatically adjusting a rate limit rule. At block 1105 of method 1100, processing logic determines a number of requests from a device that have been rejected based on a rate limiting rule. In some implementations, processing logic may access a data store of collected statistics captured during processing of past requests. At block 1110, processing logic determines that the number of rejected requests exceeds a threshold. At block 1115, processing logic automatically adjusts the rate limiting rule. In some implementations, if the number of rejected requests exceeds a high threshold, processing logic may automatically increase the rate limit parameters for that rate limiting rule. For example, the rate limit may be increased from one request per second to two requests per second. After block 1115, the method of FIG. 11 terminates.

Figure 12:
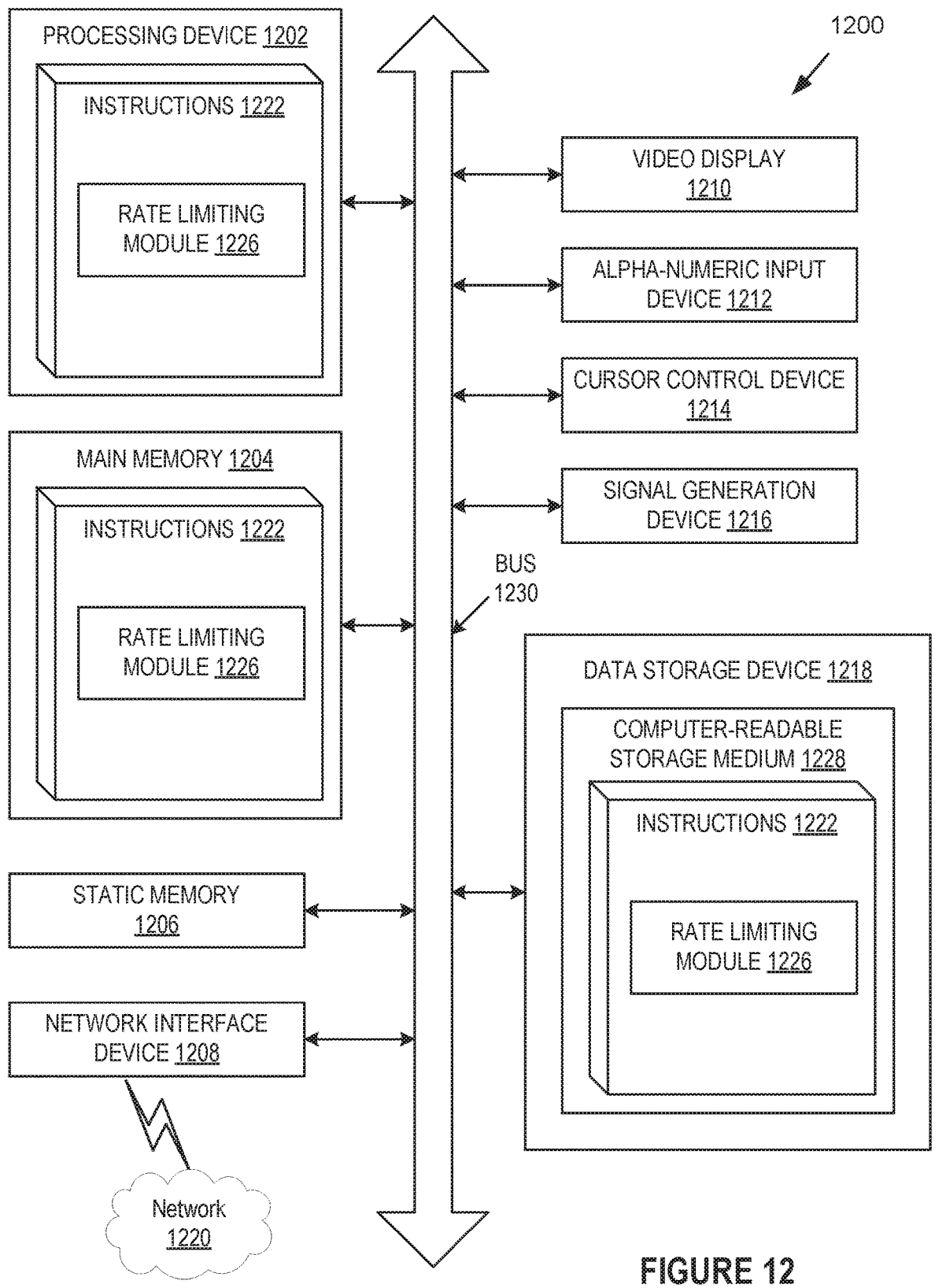
FIG. 12 illustrates a block diagram of one embodiment of a computing device.

FIG. 12 illustrates a diagrammatic representation of a machine in the example form of a computing device 1300 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1200 includes a processing device 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a secondary memory (e.g., a data storage device 1218), which communicate with each other via a bus 1230.

Processing device 1202 represents one or more general-purpose processors such as a microprocessor, central processing unit, or the like. More particularly, the processing device 1202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. Processing device 1202 is configured to execute the processing logic (instructions 1222) for performing the operations and steps discussed herein.

The computing device 1200 may further include a network interface device 1308. The computing device 1000 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker).

The data storage device 1218 may include a machine-readable storage medium (or more specifically a computer-readable storage medium) 1228 on which is stored one or more sets of instructions 1222 embodying any one or more of the methodologies or functions described herein. The instructions 1222 may also reside, completely or at least partially, within the main memory 1204 and/or within the processing device 1202 during execution thereof by the computer system 1200, the main memory 1204 and the processing device 1202 also constituting computer-readable storage media.

The computer-readable storage medium 1228 may also be used to store a rate limiting module 1226 (as described with reference to FIGS. 1-2), and/or a software library containing methods that call a remote control application. While the computer-readable storage medium 1228 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The modules, components and other features described herein (for example in relation to FIGS. 1-3) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "rejecting", "forwarding", "determining", "starting", "comparing", "generating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
receiving, by a processing device executing a reverse proxy, a first request at a first time, wherein the first request comprises a first tag associated with a first attribute and a second tag associated with a second attribute;
responsive to receiving the first request, determining whether timers have been started for the first tag and the second tag;
responsive to determining that timers have not been started for the first tag and the second tag, starting a first timer for the first tag of the first request based on a first rate limit associated with the first attribute, and a second timer for the second tag of the first request based on a second rate limit associated with the second attribute, wherein the first timer is different from the second timer, and wherein the second rate limit is higher than the first rate limit;
receiving a second request at a second time that occurs after the first time, wherein the second request comprises the first tag and the second tag;
responsive to determining that the second request violates the first rate limit for the first attribute, rejecting the second request;
receiving a third request at a third time that occurs after the second time, wherein the third request comprises the first tag and the second tag;
determining that the third request violates a second rate limit for the second attribute;
determining that the second rate limit is to be bypassed for the third request; and
forwarding the third request.

2. The method of claim 1, wherein the first timer and the second timer are started at a same start time.

3. The method of claim 1, wherein determining that the second request violates the first rate limit for the first attribute comprises:
determining that at the second time the second timer has expired and the first timer has not expired.

4. The method of claim 3, wherein determining that the second request violates the first rate limit for the first attribute further comprising:
determining that a total number of requests that have been received between the first time and the second time meets a threshold value, wherein each of the requests comprises the first tag and the second tag, and wherein the threshold value is associated with the first attribute.

5. The method of claim 3, wherein starting the first timer comprises:
creating a first entry in a hash table for the first tag;
creating a first object in a memory space, the first object comprising a first expiration time based on the first rate limit; and
associating the first entry with the first object.

6. The method of claim 5, wherein determining that the first timer has not expired comprises:
accessing the first entry in the hash table for the first tag;
determining the first expiration time of the first object; and
comparing the second time to the first expiration time.

7. The method of claim 1, wherein rejecting the second request comprises:
starting a third timer for the second tag based on the second rate limit, and
starting a bypass timer associated with the third timer, the bypass timer to expire at a same time as the third timer.

8. The method of claim 7, wherein determining that the third request violates the second rate limit comprises:
determining that at the third time the first timer has expired and the third timer has not expired.

9. The method of claim 8, wherein determining that the second rate limit is to be bypassed comprises:
determining that the bypass timer has not expired; and
starting a fourth timer for the first tag based on the first rate limit.

10. The method of claim 1, wherein the third request is forwarded to a multi-tenant application, and wherein forwarding the third request to the multi-tenant application comprises:
determining a routing rule associated with the third request, wherein the routing rule is based on information contained in the third request; and
identifying the multi-tenant application using the routing rule.

11. The method of claim 9, further comprising:
receiving a fourth request at a fourth time that occurs after the third time, wherein the fourth request comprises the second tag but not the first tag;
determining that at the fourth time the third timer has expired and the fourth timer has not expired;
starting a fifth timer for the second tag based on the second rate limit, and
forwarding the fourth request.

12. The method of claim 1, further comprising:
wherein the first request is received from a first embedded system,
wherein the second request is received from at least one of the first embedded system or a second embedded system, and
wherein the third request is received from at least one of the first embedded system, the second embedded system or a third embedded system.

13. A method comprising:
receiving, by a processing device, a first request comprising a first tag associated with a first attribute and a second tag associated with a second attribute;
determining that a first rate limiter object is associated with the first tag, the first rate limiter object comprising a first expiration time and having been generated responsive to a previously received request and based on a first rate limit rule associated with the first tag;
rejecting the first request based on the first rate limiter object;
determining a second rate limit rule associated with the second tag of the first request, wherein the first rate limit rule is more restrictive than the second rate limit rule;
generating a second rate limiter object associated with the second tag, the second rate limiter object comprising a second expiration time, and wherein the second rate limiter object is different from the first rate limiter object; and
generating a rate limiter bypass object that references the first rate limiter object and the second rate limiter object, the rate limiter bypass object comprising the second expiration time, wherein the rate limiter bypass object is to prevent, responsive to satisfaction of one or more criteria, the second rate limiter object from causing a future request to be rejected.

14. The method of claim 13, wherein the one or more criteria comprises:
    a first criterion that the future request comprises the first tag and the second tag;
    a second criterion that the first rate limiter object has expired at a time that the future request is received; and
    a third criterion that the second rate limiter object has not expired at the time that the future request is received.

15. The method of claim 14, further comprising:
    receiving a second request comprising the first tag and the second tag;
    determining that the first rate limiter object has expired;
    determining that the second rate limiter object has not expired;
    determining that the rate limiter bypass object that references the second rate limiter object is existent; and
    forwarding the second request to a multi-tenant application.

16. The method of claim 14, further comprising:
    receiving a second request comprising the second tag but not the first tag;
    determining that the first rate limiter object has expired;
    determining that the second rate limiter object has not expired; and
    rejecting the second request.

17. The method of claim 13, wherein the first tag comprises a first one of an internet protocol (IP) address, an original equipment manufacturer (OEM) identifier, a token, or a user identifier and the second tag comprises a second one of the IP address, the OEM identifier, the token, or the user identifier.

18. The method of claim 13, further comprising:
    determining a number of requests from a device that have been rejected in a time period based on at least one of the first rate limit rule or the second rate limit rule;
    determining that the number of requests exceeds a threshold; and
    automatically adjusting at least one of the first rate limit rule or the second rate limit rule.

19. A non-transitory computer readable storage medium having instructions that, when executed by a processing device, cause the processing device to perform operations comprising:
    receiving, by a processing device executing a reverse proxy, a first request from an embedded system at a first time, the first request to be forwarded to a multi-tenant application, wherein the first request comprises a first tag associated with a first attribute of an embedded system and a second tag associated with a second attribute of the embedded system;
    responsive to receiving the first request, determining whether timers have been started for the first tag and the second tag;
    responsive to determining that timers have not been started for the first tag and the second tag, starting a first timer for the first tag of the first request based on a first rate limit associated with the first attribute, and a second timer for the second tag of the first request based on a second rate limit associated with the second attribute, wherein the first timer is different from the second timer, and wherein the second rate limit is higher than the first rate limit;
    receiving a second request from the embedded system at a second time that occurs after the first time, the second request to be forwarded to the multi-tenant application, wherein the second request comprises the first tag and the second tag;
    responsive to determining that at the second time the second timer has expired and the first timer has not expired,
        rejecting the second request;
        starting a third timer for the second tag of the second request based on the second rate limit, and
        starting a bypass timer associated with the third timer, the bypass timer to expire at a same time as the third timer, wherein the bypass timer is to prevent responsive to satisfaction of one or more criteria, the third timer from causing a future request to be rejected.

20. The non-transitory computer readable storage medium of claim 19, the operations further comprising:
    receiving a third request from the embedded system at a third time that occurs after the second time, the third request to be forwarded to the multi-tenant application, wherein the third request comprises the first tag and the second tag; and
    responsive to determining that at the third time the first timer has expired and the third timer has not expired,
        determining that the bypass timer has not expired,
        starting a fourth timer for the first tag of the third request based on the first rate limit, and
        forwarding the third request to the multi-tenant application.

* * * * *